Figure 1:
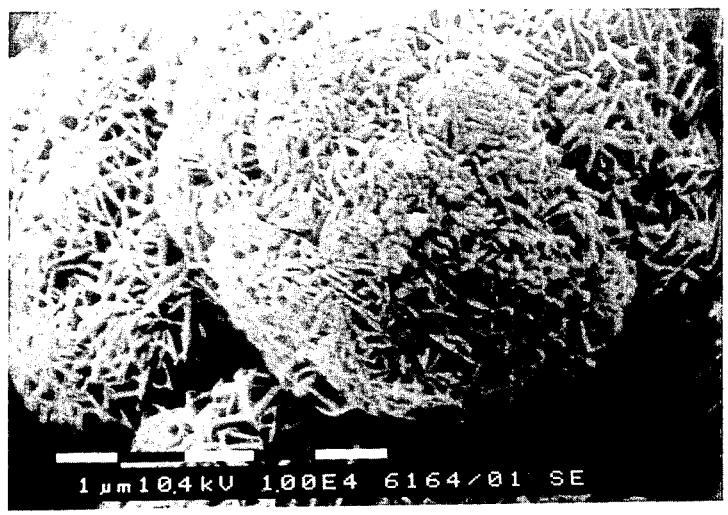

United States Patent [19]

Oudejans et al.

[11] Patent Number: 4,631,265
[45] Date of Patent: Dec. 23, 1986

[54] NICKEL/ALUMINA/SILICATE CATALYST, ITS PREPARATION

[75] Inventors: Johannes C. Oudejans, Delft; Peter Nootenboom, Oud-Beyerland; Keshab L. Ganguli, Bleiswijk; Cornelis M. Lok, Rockanje, all of Netherlands

[73] Assignee: Internationale Octrooi Maatschappij "Octropa" P.B.V., Rotterdam, Netherlands

[21] Appl. No.: 747,439

[22] Filed: Jun. 21, 1985

[30] Foreign Application Priority Data

Jun. 21, 1984 [NL] Netherlands ............ 8401965

[51] Int. Cl.$^4$ .............. B01J 21/12; B01J 23/74
[52] U.S. Cl. ............................ 502/259; 502/235
[58] Field of Search ................... 502/235, 259

[56] References Cited

U.S. PATENT DOCUMENTS

| 2,645,620 | 7/1953 | Paterson | 502/259 X |
| 2,921,971 | 1/1960 | Holm et al. | 502/259 X |
| 2,926,207 | 2/1960 | Folkins et al. | 502/259 X |
| 3,759,843 | 9/1973 | Holscher et al. | 502/259 |

FOREIGN PATENT DOCUMENTS 0167201  8/1986  European Pat. Off. .
143843   9/1980  Fed. Rep. of Germany ...... 502/235

Primary Examiner—Carl F. Dees
Attorney, Agent, or Firm—Cushman, Darby & Cushman

[57] ABSTRACT

The invention provides a nickel/alumina/silicate catalyst, with an atomic ratio of nickel/aluminium between 20 and 2, a nickel/silicate ratio between 20 and 1, an active nickel surface area between 70 and 150 m$^2$/g nickel and an average pore size, depending on the above atomic ratio, between 4 and 20 nanometers. Preferably the nickel/aluminium atomic ratio is between 10 and 4 and the nickel/silicate ratio between 12 and 3. Preferably the catalyst has a specific porous structure.

The invention also provides a method for preparing the catalyst by a two step process involving precipitating nickel ions and adding during a second, so-called aging step a soluble aluminium compound and optionally the silicate. The silicate is preferably added during a second aging step.

The catalyst is useful for hydrogenating unsaturated organic compounds in particular oils.

14 Claims, 3 Drawing Figures (EXAMPLE 4 - 10,000X)

(EXAMPLE 5 - 10,000X)

(EXAMPLE 6 - 10,000X)

NICKEL/ALUMINA/SILICATE CATALYST, ITS PREPARATION

The application relates to a hydrogenation catalyst containing nickel alumina and silicate, as well as to the preparation and use thereof.

Catalysts containing nickel/alumina are known and are mainly applied for the preparation of methane-rich gas. It is usual to prepare such catalysts by co-precipitating nickel- and aluminum ions from a solution with an alkaline reagent like, e.g., ammonium carbonate as is disclosed in US-A-No. 3 320 182 (Esso Research).

According to this co-precipitation method, catalysts are obtained which have reasonably good properties, but the filterability of the catalyst precursor (green cake) and catalytic properties, particularly in the hydrogenation of unsaturated triglyceride oils, are inadequate. The BET total surface area of these catalysts is typically below 200 m$^2$/g of catalyst and the average pore size is in the order of a few nanometers.

The present invention provides novel nickel-/alumina/silicate catalysts which have considerably improved properties and which have an atomic ratio of nickel/aluminium between 20 and 2, the nickel/silicate ratio between 20 and 1, the active nickel surface area is between 70 and 150 m$^2$/g nickel and the average pore size, depending on the above atomic ratios, is between 4 and 20 nanometers.

The improved properties are a higher activity and (almost) the same selectivity.

Preferably the atomic ratio of nickel to aluminium of these catalysts is between 10 and 4 and the nickel/silicate ratio between 12 and 3, preferably between 12 and 8 because this results in a higher hydrogenation selectivity of the catalyst i.e. less formation of completely saturated triglycerides which is probably due to a higher average mesopore size.

Further more these catalysts preferably have an open, porous structure with macropores of 50–500 nanometers, depending on the Al/silicate ratio, and mesopores having an average size between 8 and 20 nanometers. As is apparent from electron microscopy (FIGS. 1–3) the macropores are formed by interconnected catalyst platelets.

As a rule, these catalysts have an active nickel surface area between 90 and 150 m$^2$/g of nickel. The BET total surface area is usually between 90 and 450 m$^2$/g of catalyst. The average diameter of the nickel crystallites is preferably between 1 and 5 nanometers.

The above-mentioned improved catalysts can be advantageously prepared by a process in which an insoluble nickel compound is precipitated from an aqueous solution of a nickel salt with an excess alkaline precipitating agent, which precipitate is subsequently allowed to age in suspended form and is then collected, dried and reduced, wherein, after the nickel ions have been precipitated, a soluble aluminium compound and a soluble silicate are added. The soluble aluminium compound can be added as a solution but also as undissolved crystals. The soluble aluminium compound being added after the nickel ions have been substantially precipitated is e.g aluminium nitrate, sodium aluminate or alumina which dissolves at least partly in the excess alkali.

Suitable soluble silicates are e.g. waterglass, including neutral waterglass, potassium silicate is also suitable. The preparation conditions in order to obtain consistent results are less critical than for nickel-upon-guhr and coprecipitated nickel/silicate catalysts.

After precipitation and ageing according to the invention, the precipitate is separated from the liquid, usually washed, dried and activated with hydrogen at an elevated temperature, this by known procedures.

Nickel compounds which can be used as starting material for the catalysts according to this invention are water-soluble nickel compounds such as nitrate, sulphate, acetate, chloride and formate. The solutions which are charged to the precipitation reactor preferably contain between 10 and 80 g nickel per liter; especially preferred are solutions which contain between 25 and 60 g nickel per liter.

Alkaline precipitation agents which can be used as starting material for the catalysts according to the present invention are alkali metal hydroxide, alkali metal carbonate, alkali metal bicarbonate, the corresponding ammonium compounds and mixtures of the above-mentioned compounds. The concentration of the alkaline solution which is fed into the precipitation reactor is preferably between 20 and 300 g alkaline material (calculated as anhydrous material) per liter (in as far as the solubility allows this), more particularly between 50 and 250 g per liter.

It is convenient to use both solutions (of metal salt and alkaline compound) in almost the same concentrations (expressed in equivalents), so that approximately the same volumes can be reacted.

The metal-containing solution and the alkaline solution are added in such amounts per unit of time that an excess of alkaline compound is present during the precipitation step, so that the normality of the liquid is between 0.05 and 0.5, preferably between 0.1 and 0.3 (this normality is determined by titrating a solution of hydrochloric acid, with methyl-orange as indicator). Sometimes it is necessary to add some more alkaline solution during the ageing step, in order to keep the normality within the range indicated above.

The precipitation reactor has such dimensions with respect to the amounts of liquid pumped in, that short average residence times can be obtained. As a rule, average residence times of between 0.1 sec. and 10 minutes, preferably between 0.2 sec. an 4.5 minutes ared used in the precipitation reactor.

In a preferred embodiment, in which the precipitation step (step 1) is carried out continuously, the amounts of solutions fed into the precipitation reactor are controlled by measuring, optionally continuously, the normality or pH of the reactor effluent.

The temperature at which the precipitation takes place can be controlled by adjusting the temperatures of the liquids fed in. The required vigorous agitation of the liquid in the precipitation reactor preferably takes place with a mechanical energy input of between 5 and 2000 watts per kg of solution. More preferably the agitation takes place with a mechanical energy input of 100 to 2000 watts per kg of solution.

The reaction mixture obtained from the precipitation reactor goes immediately thereafter to a stirred post-reactor of a significantly higher capacity in which the suspension is agitated and aged. At this stage soluble aluminium compounds and possible other compounds and possibly soluble silicate are added, and optionally carrier material and promotors if any. The amount of aluminium compound added as 0.1 to 0.5, preferably 0.1 to 0.25 mol aluminium ions per gram atom of nickel in the suspension. Preferably, a soluble compound such as aluminium nitrate or sodium aluminate is added. Preferably the liquid in the ageing reactor, thus during the ageing step, is kept at a temperature between 40° and 100° C., preferably between 60° and 98° C.

Soluble silicate can be added to the first ageing reactor but preferably to the second ageing reactor. The amount of silicate added is from 0.05–1 mole per gram atom of nickel, preferably between 0.1 and 0.5 mole.

The precipitation step and also the maturing step can be carried out batchwise (=discontinuously), continuously and semi-continuously (e.g. according to the cascade method).

Usually the normality of the liquid in the ageing-reactor during the ageing step (step 2) is kept in the same range as during the precipitation step (step 1); if necessary by adding some more alkali. The ageing step can be carried out in one or more reactors, the (total) average residence time being maintained between 20 and 180 minutes, preferably between 30 and 150 minutes. If two or more reactors are used, it is preferred to have the temperature in the second or further reactor 10 to 35 centigrades higher than in the preceding ageing reactor, if required under super-atmospheric pressure.

After the ageing step has been completed, the solid material is separated from the mother liquor, usually washed, dried, optionally ground and calcined and thereafter activated with hydrogen at an temperature, between 250 and 600, preferably between 350° and 500° C. This activation can take place at atmospheric pressure or at increased pressure.

The present process involving separate precipitation and ageing steps results in a catalyst precursor (green caks) which has a considerably improved filterability than a co-precipitated precursor at least a four fold improvement. Preferably before drying, or during a step preceding that, promotors can be added. Suitable amounts of promotors are from 0.5 to 10%, calculated on the weight of nickel, of elements such as molybdenum, cobalt, copper, iron, lanthanum, magnesium, or other elements and combinations thereof.

The solid material is preferably washed with water; sometimes some alkaline material or a surface active material is added to the washing water. Also an organic solvents, e.g. acetone can be advantageously used during washing. Drying preferably takes place with hot air. Spray-drying is preferred but freeze-drying is also quite possible.

The catalyst thus obtained is highly active and especially suitable for the hydrogenation of unsaturated organic compounds particularly oils, fats, fatty acids and fatty acid derivatives like nitriles. This hydrogenation is carried out with hydrogen at an increased temperature (80°–250° C.) and optionally an increased pressure (0.1–5.0 $10^6$ Pa).

The hydrogenated products thus obtained, e.g. hydrogenated oils, show favourable properties such as a low tri-saturated content, sometimes combined with a steep dilatation curve.

The invention is illustrated by the following examples:

EXAMPLE 1

Solutions of $Ni(NO_3)_2$ (35 g Ni per liter) and $Na_2CO_3$ anh. (100 g/l) were continuously pumped at equal flow rates into a vigorously stirred precipitation reactor, where nickel hydroxide/carbonate was precipitated at a temperature of 20° C. The pH of the suspension in this reactor was 9.0. In this precipitation reactor (volume 25 ml), the suspension had an average residence time of 0.5 min. The suspension was then transferred continuously to an ageing reactor (volume 1800 ml), in which the average residence time was 30 min. and the temperature was 66° C. Simultaneously, an amount of aluminium ions was continuously dosed into this reactor, as an aqueous solution of aluminium nitrate, at a rate of 0.068 g aluminium per min. The average Al/Ni atomic ratio was 0.15. The suspension was subsequently transferred continuously to a second ageing reactor in which the temperature was 97° C. and the average residence time was 30 minutes. In this second ageing reactor an amount of silicate ions (as neutral waterglass) was dosed continuously at a rate of 0.15 g $SiO_2$ per minute. The average Silicate/Ni molar ratio was 0.15.

The pH of the suspension in the first ageing reactor was 8.4 and in the second ageing reactor 8.9. The volume of the liquid in the first and second ageing reactor was kept constant. In Table I these data are tabulated.

The ageing step was terminated after 180 min. (6×the average residence time), and the suspension from the second ageing reactor filtered. The green filter cake thus obtained was washed with distilled water. The washed cake was: (A) spray dried; (B) washed with acetone and dried at room temperature. Thereafter the catalyst was activated for 30 minutes with hydrogen at a temperature of 400° C. From the determination of the nickel surface area by hydrogen chemisorption an average nickel crystallite size of 2.9 nanometers was calculated.

The filterability of the green cake was determined as follows:

1 liter of a green cake aqueous suspension with 4% (w.w.) solids from the ageing reactor was filtered over a Büchner funnel with a Schleicher and Scüll (trade name) black band filter with a diameter of 125 mm. The vacuum applied was 3–4,000 Pa, and obtained with an aspirator. The time of filtration in minutes necessary for filtering 4 liters of distilled water over the bed of green cake obtained was taken as a yardstick for the filterability of the green cake. This time of filtration is indicated i.a. in Table I.

The activity of the catalyst in the hydrogenation of fish oil (iodine value 165) was determined as follows:

150 g fish oil was hydrogenated at 180° C. and a hydrogen pressure of $1.10^5$ Pa with 0.07% (w.w.) of catalyst. The decrease in the refractive index of the fish oil was compared with the decrease obtained in a similar hydrogenation with a known standard catalyst and the activity was expressed as a percentage of the activity of the standard catalyst.

As to the selectivity of the catalyst: 250 g fish oil (iodine value 165) were hydrogenated to an iodine value of 85 with 0.1% (w.w.) catalyst and 60 liters $H_2$/hour at a pressure of $1.10^5$ Pa at 180° C. The melting point of the hydrogenated oil was determined *and* the time required to reach an iodine value of 85. Together they are a yardstick for the selectivity.

The oil filtration of the catalyst was determined as follows:

After the hydrogenation the suspension, i.e. the hydrogenated oil containing the catalyst, was cooled to 90° C. and pumped to a closed, double-walled filtration vessel which was connected to a thermostat at 90° C. The bottom of this vessel contained a cotton filter cloth of 30 cm diameter. After pumping the oil and the catalyst into the filtration vessel an overpressure of $3.10^5$ Pa. was applied. During the filtration this pressure was maintained with a Kendall pressure regulator. After increasing the pressure to $3.10^5$ Pa (t=o) the time of filtration time was measured. The weight of the filtered oil was determined as a function of time. Subsequently, the weight of the filtered oil (x-axis) was plotted graphically against the filtration time divided by the relevant weight of the oil (y-axis). The slope of the line obtained was taken as a yardstick for the filter resistance of the cake. These values are indicated in Table II for 150 g oil in min./g.

EXAMPLES 2 AND 3

In accordance with the procedure described in Example 1, more catalysts according to the invention were prepared, variations being made, however, in the amounts of starting materials and conditions, as indicated in Table I below. The properties of these catalysts are summarized in Table II.

It is noteworthy that, on an average, very short hydrogenation times could be used and the catalyst retained its activity for a prolonged period and tends to show a high poison resistance. An excellent selectivity was also observed, i.e. there was less tri-saturated triglyceride formed especially in the hydrogenation of soya bean oil. Further, the melting point of the hydrogenated oils were independent of the ratio of (Aluminium plus silicate) to Ni and independent of the ratio aluminium to silicate. Finally, also the filtration properties of green cake and catalyst after hydrogenation (oil filtration) were particularly favourable.

EXAMPLES 4, 5 AND 6

The procedure followed was identical to that of Example 1. In this case solutions of $Ni(NO_3)_2$ (35 g Ni(1)) and $Na_2CO_3$ anh (100 g/1) were brought together at equal flow rates (32 ml/min. $^{-1}$) at 20° C. The pH of the suspension in the precipitation reactor was about 9.2. This suspension was subsequently transferred continuously to the ageing reactor (volume 1800 ml). Simultaneously, an amount of aluminium ions and neutral waterglass were dosed continuously into this single ageing reactor.

Figure 2:
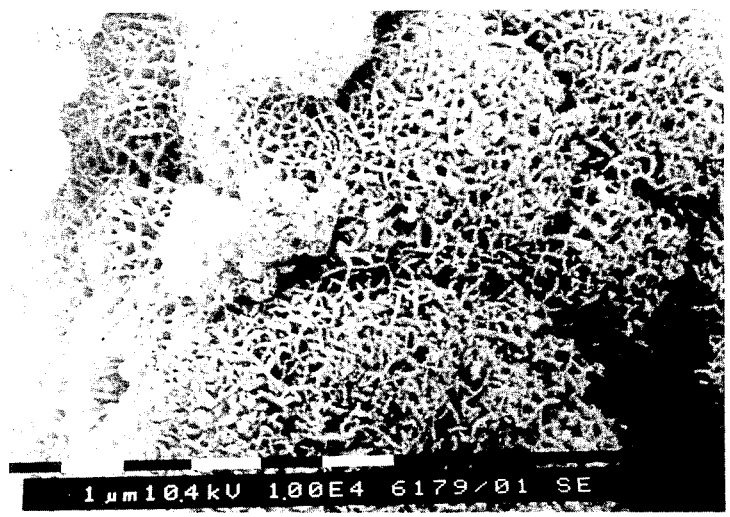
Figure 3:

In examples 4-6 the (Aluminate+Silicate) to Nickel molar ratio was kept constant at 0.27. The molar ratio Aluminate/Silicate was varied from 3.6 (example 4), to 1.36 (example 5) and 0.22 (example 6). FIGS. 1-3 which are electromicrographs of the catalysts of examples 4-6 at a magnification of $10^4$ show the open, spongy structure with the interconnected catalyst platelets forming the macropores. The dimensions of the macropores and the dimensions of the catalyst platelets can be controlled by the Aluminium/Silicate ratio applied and decrease upon decreasing Aluminate/Silicate molar ratio. The catalyst preparation is summarized in Table III and the properties in Table IV.

TABLE I

| | Example | | |
|---|---|---|---|
| | 1 | 2 | 3 |
| Ni/Al atomic ratio | 6.2 | 9 | 5.3 |
| Ni/Silicate molar ratio | 6.7 | 10 | 2.0 |
| Molarity of the soda solution | 1.0 | 1.0 | 1.0 |
| Molarity of the nickel solution | 0.6 | 0.6 | 0.6 |
| Precipitation temp (°C.) | 20 | 20 | 20 |
| Average precipitation time (min.) | 0.5 | 0.5 | 0.5 |
| pH value | 9.0 | 9.1 | 9.4 |
| Ageing temperature in the first ageing reactor (°C.) | 66 | 66 | 66 |
| Ageing temperature in the second ageing reactor (°C.) | 97 | 97 | 97 |
| Average ageing time in each ageing reactor (min) | 30 | 30 | 30 |
| pH value: | | | |
| first ageing reactor | 8.4 | 8.4 | 8.9 |
| second ageing reactor | 8.9 | 8.8 | 9.1 |
| Filterability of green cake (min.) | 3 | 3 | 2 |
| Properties of the catalyst* | | | |
| Active Ni surface area ($m^2$/g Ni) | 102 | 100 | 93 |
| Ni crystallite size (nm) | 2.9 | 3.3 | 2.4 |
| Average pore size (nm) | 6 | 4 | 5.5 |
| BET-total surface area ($m^2$/g catalyst) | 395 | 228 | 255 |

*after spray drying

TABLE II

| | Example | | |
|---|---|---|---|
| | 1 | 2 | 3 |
| Ni % in the reduced catalyst | 85 | 90 | 87 |
| Fish oil activity after spray-drying (%) | 122 | 178 | 88 |
| Fish oil activity after washing with acetone (%) | 202 | 195 | — |
| Selectivity: | | | |
| Hydrogenation time (min.) Spray-drying | 110 | 96 | 137 |
| Melting point (°C.) Spray-drying | 33.0 | 32.0 | 33.0 |
| Oil filtration after hydrogenating 150 g oil (min. g$^{-1}$) Spray-drying | 0.2 | 0.26 | 0.1 |

TABLE III

| | Example | | |
|---|---|---|---|
| | 4 | 5 | 6 |
| Ni/Al atomic ratio | 5 | 6.6 | 20 |
| Ni/silicate molar ratio | 17 | 9 | 4.5 |
| Molarity of the soda solution | 1.0 | 1.0 | 1.0 |
| Molarity of the nickel solution | 0.6 | 0.6 | 0.6 |
| Precipitation temperature (°C.) | 20 | 20 | 20 |
| Average precipitation time (min.) | 0.5 | 0.5 | 0.5 |
| pH value | 9.1 | 9.2 | 9.3 |
| Ageing temperature (°C.) | 97 | 97 | 97 |
| Average ageing time (min.) | 30 | 30 | 30 |
| pH value | 8.8 | 8.8 | 8.7 |
| Filterability of green cake (min.) | 3 | 2.5 | 2.5 |
| Properties of the catalyst* | | | |
| Acive Ni surface area ($m^2$/g Ni) | 86 | 91 | 98 |
| Ni crystallite size (nm) | 3.0 | 3.3 | 3.9 |
| Average pore size (nm) | 8 | 14 | 4 |
| BET-total surface area ($m^2$/g catalyst) | 231 | 230 | 402 |

*spray-dried

TABLE IV

| | Example | | |
|---|---|---|---|
| | 4 | 5 | 6 |
| Ni % in the reduced catalyst | 85 | 85 | 85 |
| Fish oil activity after spray-drying (%) | 98 | 86 | 150 |

TABLE IV-continued

| | Example | | |
|---|---|---|---|
| | 4 | 5 | 6 |
| Selectivity: | | | |
| Hydrogenation time (min.) Spray-drying | 113 | 103 | 116 |
| Melting point (°C.) Spray-drying | 33.0 | 33.5 | 33.0 |
| Oil filtration after hydrogenating 150 g oil (min. $g^{-1}$) Spray-drying | 0.25 | — | 0.17 |

We claim:

1. A nickel/alumina/silicate catalyst, in which the atomic ratio of nickel/aluminium is between 20 and 5, the nickel/silicate molar ratio between 20 and 4.5 and the active nickel surface area is between 70 and 150 m$^2$/g nickel, which catalyst has an open, porous structure with macropores of 50–500 nanometers and a mesopore structure having an average pore size between 8 and 20 nanometers.

2. A catalyst according to claim 1, in which the active nickel surface area is between 90 and 150 m$^2$/g nickel.

3. A catalyst according to claim 1, in which the BET total surface area is between 80 and 450 m$^2$/g catalyst.

4. A catalyst according to claim 1, in which the nickel crystallites have an average diameter between 1 and 5 nanometers.

5. A catalyst according to claim 1 in which the macropores are formed by interconnected catalyst platelets.

6. A process for the preparation of a nickel/alumina/silicate catalyst as defined in claim 1 wherein an insoluble nickel compound is precipitated from an aqueous solution of a nickel salt with an excess alkaline precipitating agent, which precipitate is subsequently allowed to age in suspended form and is then collected, dried and reduced, in which, after the nickel ions have been precipitated, a soluble aluminium compound and a soluble silicate added.

7. A process according to claim 6, in which the soluble aluminium compound is added to the suspension within 15 minutes after precipitation of the nickel ions.

8. A process according to claim 6, in which a soluble aluminium compound is added in an amount of 0.1 to 0.5 mol, aluminium ions per gram atom of nickel and soluble silicate is added in an amount of 0.05 to 1 mol per gram atom of nickel in the suspension.

9. A process according to claim 8, in which the amount of aluminium compound is between 0.1 and 0.25 and the soluble silicate in an amount of 0.1 to 0.5.

10. A process according to claim 6, in which the ageing is carried out during a period of 20 to 180 minutes.

11. A process according to claim 6, in which the ageing is carried out at a temperature between 40° and 100° C.

12. A process according to claim 6, in which the precipitation is carried out continuously by dosing an aqueous metal salt solution and an alkaline precipitating agent solution together in a small, vigorously agitated mixing device and thereafter pumping the suspension into one or more post-reactors.

13. A process according to claim 14 in which two or more post reactors are used and that aluminium is added to the first post reactor and silicate is added to the second post reactor.

14. A process according to claim 12, in which two or more post-reactors are used, the temperature in the second and possibly following post-reactor being 5–35 centigrades higher than that in the first post-reactor.

* * * * *

UNITED STATES PATENT AND TRADEMARK OFFICE
CERTIFICATE OF CORRECTION

PATENT NO. : 4,631,265

DATED : December 23, 1986

INVENTOR(S) : OUDEJANS et al.

It is certified that error appears in the above-identified patent and that said Letters Patent is hereby corrected as shown below:

TITLE PAGE: "FOREIGN PATENT DOCUMENTS", reference No. 143843 9/1980 "Fed. Rep. of Germany" should read:

-- German Democratic Republic --.

Signed and Sealed this

Twelfth Day of January, 1993

*Attest:*

DOUGLAS B. COMER

*Attesting Officer*      *Acting Commissioner of Patents and Trademarks*